United States Patent
Kim et al.

(10) Patent No.: US 10,773,610 B2
(45) Date of Patent: Sep. 15, 2020

(54) DEVICE FOR SWIVELING AND TILTING VEHICLE SEAT

(71) Applicants: Hyundai Motor Company, Seoul (KR); Kia Motors Corporation, Seoul (KR)

(72) Inventors: Seung Hyun Kim, Daejeon (KR); Seong Mun Yun, Gyeonggi-do (KR); Hyun Kyu Moon, Gyeonggi-do (KR); Ju Yeol Kong, Gyeonggi-do (KR); Seon Chae Na, Gyeonggi-do (KR); Hyung Jin Park, Seoul (KR); So Young Yoo, Gyeonggi-do (KR); Sung Hak Hong, Gyeonggi-do (KR); Chan Ho Jung, Gyeonggi-do (KR); Mu Young Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 68 days.

(21) Appl. No.: 16/211,747

(22) Filed: Dec. 6, 2018

(65) Prior Publication Data
US 2020/0101868 A1    Apr. 2, 2020

(30) Foreign Application Priority Data
Sep. 28, 2018  (KR) .................. 10-2018-0115434

(51) Int. Cl.
*B60N 2/02*    (2006.01)
*B60N 2/14*    (2006.01)
*B60N 2/10*    (2006.01)

(52) U.S. Cl.
CPC ............. *B60N 2/0232* (2013.01); *B60N 2/10* (2013.01); *B60N 2/14* (2013.01); *B60N 2002/0236* (2013.01)

(58) Field of Classification Search
CPC .......... B60N 2/0232; B60N 2/10; B60N 2/14; B60N 2/245; B60N 2/38
USPC ....... 248/415, 416, 418, 157, 421, 422, 424, 248/425, 346.01; 297/344.1, 344.13, 297/344.15, 344.25, 313; 296/65.06, 296/65.07, 3
See application file for complete search history.

(56) References Cited

U.S. PATENT DOCUMENTS

| | | | | |
|---|---|---|---|---|
| 3,594,040 A | * | 7/1971 | Monroe | B60N 2/502 297/257 |
| 3,726,560 A | * | 4/1973 | Page | A47C 3/00 297/344.24 |
| 3,954,245 A | * | 5/1976 | Costin | B60N 2/235 248/550 |
| 4,194,716 A | * | 3/1980 | Barecki | B60N 2/502 248/394 |

(Continued)

*Primary Examiner* — Terrell L McKinnon
*Assistant Examiner* — Michael McDuffie
(74) *Attorney, Agent, or Firm* — Mintz Levin Cohn Ferris Glovsky and Popeo, P.C.; Peter F. Corless

(57) ABSTRACT

A device for swiveling and tilting a vehicle seat is provided. The device performs a swiveling operation to enable the vehicle seat to be rotated in a desired direction using a motor driving force and a gear/screw operating mechanism associated with the motor driving force. The device also performs a tilting operation to enable the vehicle seat to be tilted backwards by a desired angle using the motor driving force and a lead screw/link operating mechanism associated with the motor driving force.

12 Claims, 6 Drawing Sheets

(56) References Cited

U.S. PATENT DOCUMENTS

| | | | | |
|---|---|---|---|---|
| 4,846,529 A * | 7/1989 | Tulley | B60N 2/0232 297/344.23 |
| 4,955,575 A * | 9/1990 | Moore | B60N 2/01558 248/398 |
| 5,524,952 A * | 6/1996 | Czech | B60N 2/14 296/65.12 |
| 6,168,234 B1 * | 1/2001 | Haynes | B60N 2/143 297/344.21 |
| 6,322,250 B1 * | 11/2001 | Pratt | A61B 6/04 280/250.1 |
| 6,688,665 B2 * | 2/2004 | Michel | B60N 2/10 296/65.07 |
| 7,036,883 B1 * | 5/2006 | Thompson | B60N 2/0224 297/344.24 |
| 8,292,368 B1 * | 10/2012 | Yarbrough | A47C 1/029 297/326 |
| 8,827,367 B2 * | 9/2014 | Hibi | B60N 2/0232 297/344.24 |
| 8,936,295 B2 * | 1/2015 | Slungare | B60N 2/0232 296/65.12 |
| 10,518,670 B1 * | 12/2019 | Olufemi-Jones | B60N 2/07 |
| 2012/0153697 A1 * | 6/2012 | Hibi | B60N 2/0232 297/344.24 |
| 2013/0257127 A1 * | 10/2013 | Bullis | B60N 2/14 297/314 |
| 2016/0374879 A1 * | 12/2016 | Christian | A47C 1/029 297/313 |
| 2017/0120776 A1 * | 5/2017 | Slungare | B60N 2/06 |
| 2017/0182914 A1 * | 6/2017 | Lonstein | B60N 2/0232 |
| 2019/0184875 A1 * | 6/2019 | Gomez | B60N 2/0248 |
| 2020/0047642 A1 * | 2/2020 | Han | B60N 2/1615 |

* cited by examiner

DEVICE FOR SWIVELING AND TILTING VEHICLE SEAT

CROSS-REFERENCE TO RELATED APPLICATION

This application claims under 35 U.S.C. § 119(a) the benefit of priority to Korean Patent Application No. 10-2018-0115434 filed on Sep. 28, 2018, the entire contents of which are incorporated herein by reference.

BACKGROUND

(a) Technical Field

The present disclosure relates to a device for swiveling and tilting a vehicle seat, and more particular, to a device that performs a swiveling operation to enable occupants to face each other for conversation or for assisting an occupant to get on and out of a vehicle and a tilting operation for relaxation.

(b) Background Art

With the increased development of autonomous vehicles capable of driving without a driver's control, a vehicle seat to which various mechanisms for implementing multi-party meetings, conversation, relaxation, sleeping, an assistance for getting on or out of a vehicle and the like are applied has been researched. However, a basic mechanism for front and rear position adjustment, a vertical height adjustment and a tilting function for the vehicle seat is already independently provided in the vehicle seat, and in addition to the above basic mechanism, a swiveling mechanism for providing a conversation mode between occupants and assisting an occupant to get on and out of a vehicle is required to be applied to the vehicle seat.

Therefore, an increase in the number of components of the entire vehicle sheet, complexity of the assembling structure, insufficient mounting space, and the like, inevitably occur. Therefore, there is a demand for an optimum design capable of realizing respective functions (e.g., tilting and swiveling) of a vehicle seat applied to an autonomous vehicle or the like using a single mechanism.

The above information disclosed in this section is merely for enhancement of understanding of the background of the disclosure and therefore it may contain information that does not form the prior art that is already known in this country to a person of ordinary skill in the art.

SUMMARY

The present disclosure provides a device for swiveling and tilting a vehicle seat, which may perform all of a swiveling operation for enabling the vehicle seat to be rotated in a desired direction using a motor driving force and a gear/screw operating mechanism associated with the motor driving force and a tilting operation for enabling the vehicle seat to be laid (e.g., tiled back in a lying position) by a desired angle using the motor driving force and a lead screw/link operating mechanism associated with the motor driving force.

In order to achieve the above object, the present disclosure provides a device for swiveling and tilting a vehicle seat that may include a track panel mounted on a floor panel; a hinge bracket mounted on the track panel; a stationary plate mounted on a seat cushion frame; a first screw coupling body mounted on a lower portion of the stationary plate; a second screw coupling body configured to be tiltably mounted on the hinge bracket; a first motor configured to provide a rotational driving force to the first screw coupling body or the second coupling body for swiveling the vehicle seat when the first screw coupling body and the second coupling body are screw-coupled with each other; a second motor mounted on the track panel and configured to tilt the vehicle seat; and a tilting link hinge-connected between a front end portion of the second screw coupling body and an output shaft of the second motor.

As one exemplary embodiment of the present disclosure, the first screw coupling body may be provided as a cylindrical body having a female thread formed on an inner circumferential surface thereof and may be mounted on an edge of a lower surface of the stationary plate, the second screw coupling body may be provided as a cylindrical body having a male thread formed on an outer circumferential surface thereof, and a motor mounting plate for mounting the first motor may be mounted on an inner circumferential surface of the second screw coupling body, both sides of the second screw coupling body may be hinge-coupled to the hinge bracket.

Additionally, a pinion gear may be mounted to an output shaft of the first motor, and a sector gear engaging the pinion gear may be formed on the lower surface of the stationary plate. In addition, a pair of guide brackets may be mounted on the track panel, each of the guide brackets may have an elongated slot formed thereon, and guide pins formed on both sides of a rear end portion of the tilting link may be inserted into the slots of the guide brackets, respectively.

Further, a link connecting end may be integrally formed with a front portion of the inner circumferential surface of the second screw coupling body to be hinge-coupled with the tilting link. First hinge ends may be integrally formed with both sides of the hinge bracket, respectively, and second hinge ends may be integrally formed at lower end portions of both sides of the second screw assembly, respectively. In particular, each of the second hinge ends may overlap and be coupled with the corresponding first hinge end by a hinge pin.

As another exemplary embodiment of the present disclosure, the first screw coupling body may be provided as a cylindrical body having a male thread formed on an outer circumferential surface thereof and may be mounted on a lower surface of the stationary plate. The second screw coupling body may be provided as a cylindrical body having a female thread formed on an inner circumferential surface thereof, and both sides of the second screw coupling body may be hinge-coupled to the hinge bracket.

In addition, the first motor having a driving bevel gear mounted on the output shaft thereof may be mounted on a predetermined position of the lower surface of the stationary plate, and a driven bevel gear that engages the driving bevel gear may be formed on an upper surface of the second screw coupling body. A plurality of deviation preventing ribs arranged alternately and spaced from each other may be integrally formed on the lower surface of the stationary plate and on the upper surface of the second screw coupling body along a circumferential direction. The track panel may have slide rails formed on both sides of a lower surface thereof, respectively, for adjusting front-rear positions of the vehicle seat.

BRIEF DESCRIPTION OF THE DRAWINGS

The above and other features of the present disclosure will now be described in detail with reference to exemplary embodiments thereof illustrated the accompanying drawings which are given hereinbelow by way of illustration only, and thus are not limitative of the present disclosure, and wherein.

Figure 1:
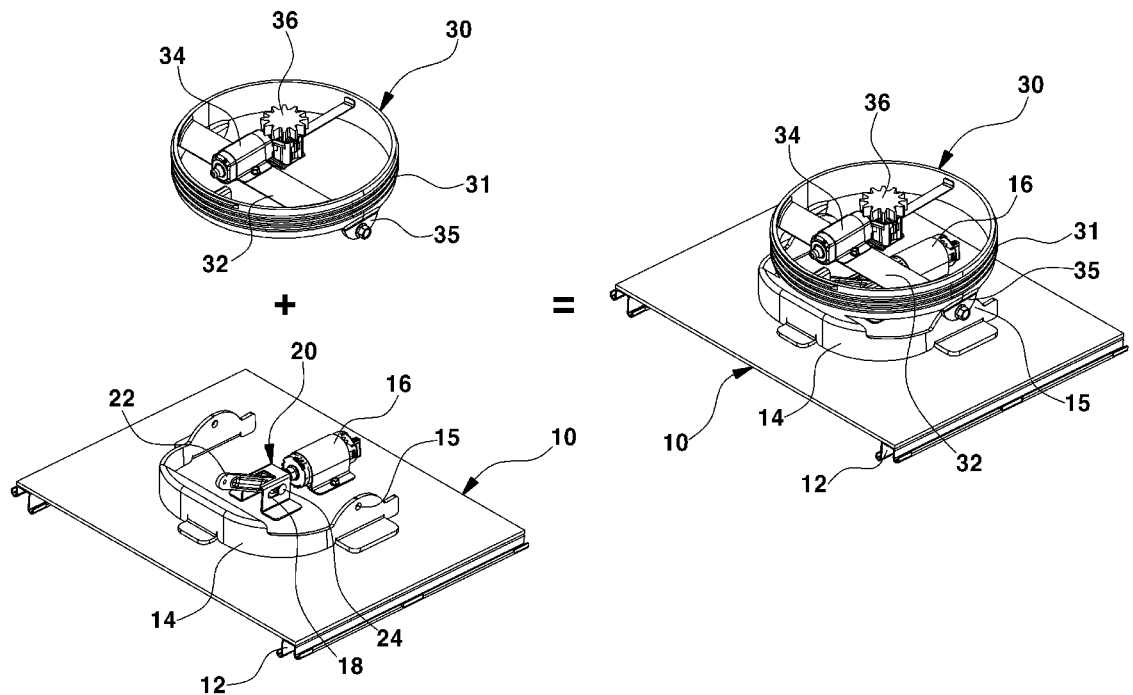
FIGS. 1 and 2 are perspective views illustrating a device for swiveling and tilting a vehicle seat according to an exemplary embodiment of the present disclosure.

It should be understood that the appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes will be determined in part by the particular intended application and use environment. In the figures, reference numbers refer to the same or equivalent parts of the present disclosure throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter reference will now be made in detail to various exemplary embodiments of the present disclosure, examples of which are illustrated in the accompanying drawings and described below. While the disclosure will be described in conjunction with exemplary embodiments, it will be understood that present description is not intended to limit the disclosure to those exemplary embodiments. On the contrary, the disclosure is intended to cover not only the exemplary embodiments, but also various alternatives, modifications, equivalents and other embodiments, which may be included within the spirit and scope of the disclosure as defined by the appended claims.

Figure 2:
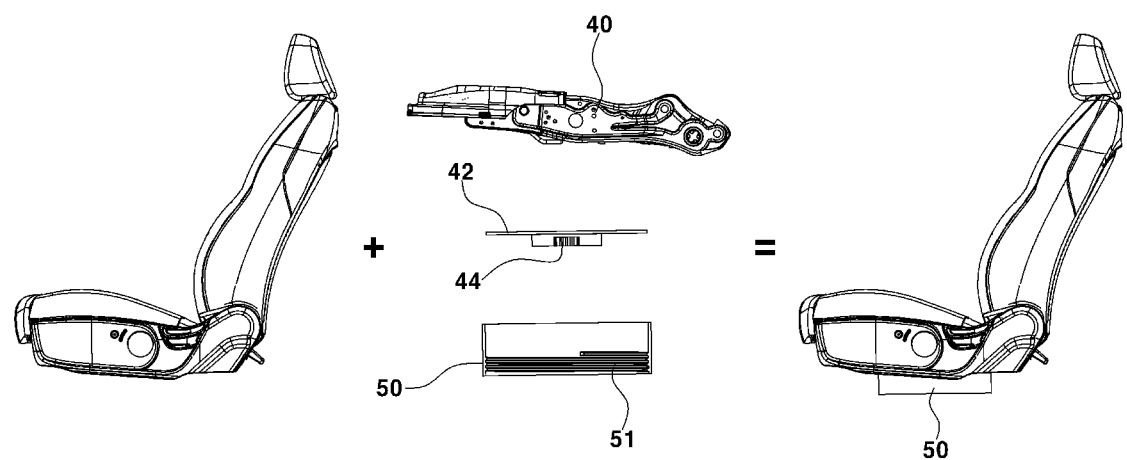

Hereinafter, exemplary embodiments of the present disclosure are described in detail with reference to the accompanying drawings. FIGS. 1 and 2 are perspective views illustrating a device for swiveling and tilting a vehicle seat according to the present disclosure, FIG. 1 shows a configuration to be mounted on a seat cushion frame, and FIG. 2 shows a configuration to be mounted on a floor panel.

Referring FIG. 1, the floor panel of an interior floor of a vehicle may include a track panel 10 capable of being moved forward and rearward. Slide rails 12 may be formed on both sides of a lower face of the track panel 10, respectively, to allow a vehicle seat to be moved forward or rearward for adjusting front and rear positions of the vehicle seat, and the slide rails 12 may be fastened to fixed rails, which are not shown in the drawings and fixedly mounted on the floor panel, such that the slide rails may be moved forward and rearward.

A hinge bracket 14 having a predetermined shape may be fixedly mounted on the track panel 10. In addition, a second motor 16 may be configured to provide a driving force for tilting the vehicle seat and may be fixedly mounted on the track panel 10. A pair of guide brackets 20 may be fixedly mounted on the track panel 10 and each of the guide brackets may have an elongated slot 18 formed therein in a front-rear direction. In particular, a second screw coupling body 30 may be tiltably hinge-mounted on the hinge bracket 14.

According to one exemplary embodiment of the present disclosure, the second screw coupling body 30 may be formed to have a cylindrical shape and may have a male thread 31 formed on an outer circumferential surface thereof, and a motor mounting plate 32 for mounting a first motor 34 for swiveling the vehicle seat may be mounted on an inner circumferential surface of the second screw coupling body. In addition, a link connecting end 33 may be integrally formed with a front portion of the inner circumferential surface of the second screw coupling body 30. At this time, first hinge ends 15 may be integrally formed with both sides of the hinge bracket 14, respectively, and second hinge ends 35 may be integrally formed at lower end portions of both sides of the second screw assembly 30, respectively. Particularly, each of the second hinge ends may overlap and be coupled with the corresponding first hinge end 15 by a hinge pin.

Accordingly, by overlapping the first hinge end 15 of the hinge bracket 14 and the second hinge end 35 of the second coupling body 30 and coupling them by the hinge pin, the second screw coupling body 30 becomes allowed to be angularly rotated forward and backward about the hinge coupling point between the first hinge end 15 and the second hinge end 35. Meanwhile, a tilting link 22 having a predetermined length may be connected between the link connecting end 33 of the second screw coupling body 30 and an output shaft 17 of the second motor 16 by a hinge.

In other words, a front end portion of the tilting link 22 may be hinge-connected to the link connecting end 33 of the second screw coupling body 30, and a rear end portion thereof may be hinge-connected to the output shaft 17 of the second motor 16. The output shaft 17 of the second motor 16 may be configured in the form of a lead screw capable of moving forward and backward to push or pull the tilting link 22, or may be configured in the form of a piston capable of being moved forward or backward.

Furthermore, to limit a forward or backward moving distance of the tilting link 22 and simultaneously to guide a forward or backward movement of the tilting link, the pair of guide brackets 20, each of which has the slot 18 formed therein, may face each other and be mounted on the track panel 10 as described above. In addition, guide pins 24 may be integrally formed with both side surfaces of the rear end portion of the tilting link 22, respectively, and may be inserted into the slots 18 of the guide brackets 20, respectively, to be able to move forward and backward.

Referring to FIG. 2, a stationary plate 42 may be mounted on a lower portion of a seat cushion frame 40, and a sector gear 44 may be mounted on a central portion of a lower surface of the stationary plate 42. In addition, a first screw coupling body 50 may be mounted on an edge of the lower surface of the stationary plate 42, and the first screw coupling body 50 may be provided as a cylindrical body having a female thread 51 formed on an inner circumferential surface thereof.

Figure 3:
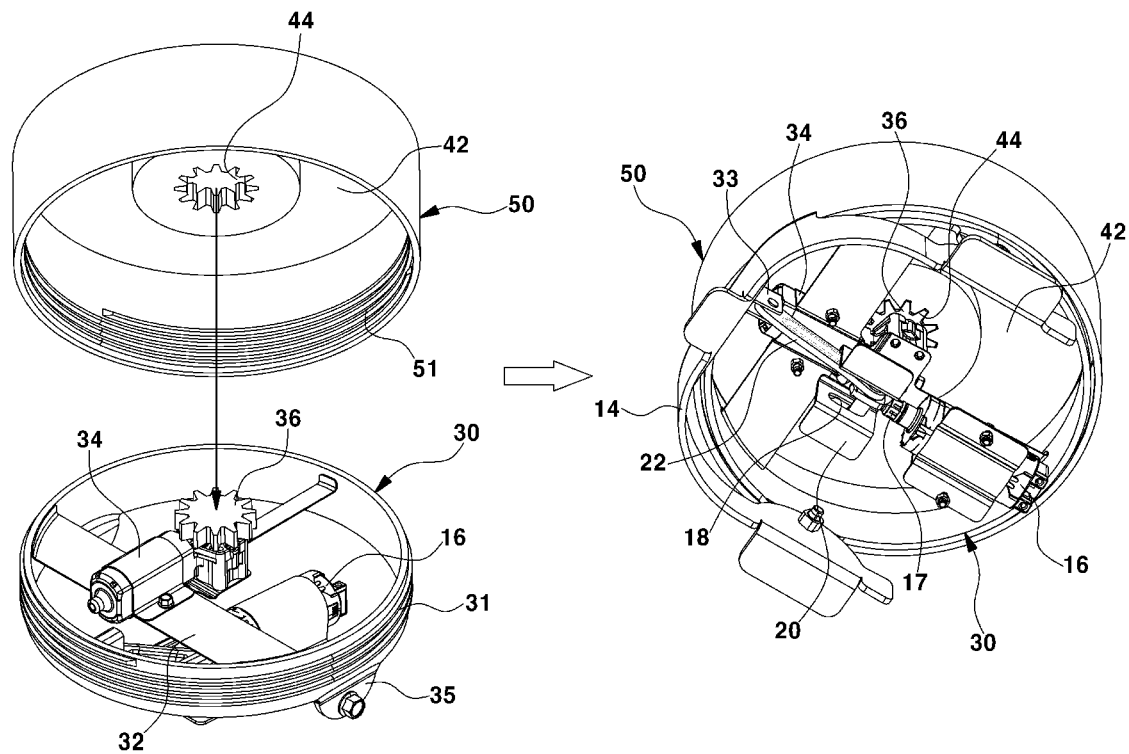
FIGS. 3 and 4 are a perspective view and a side sectional view illustrating an assembled state of the device for swiveling and tilting a vehicle seat according to an exemplary embodiment of the present disclosure.
Figure 4:
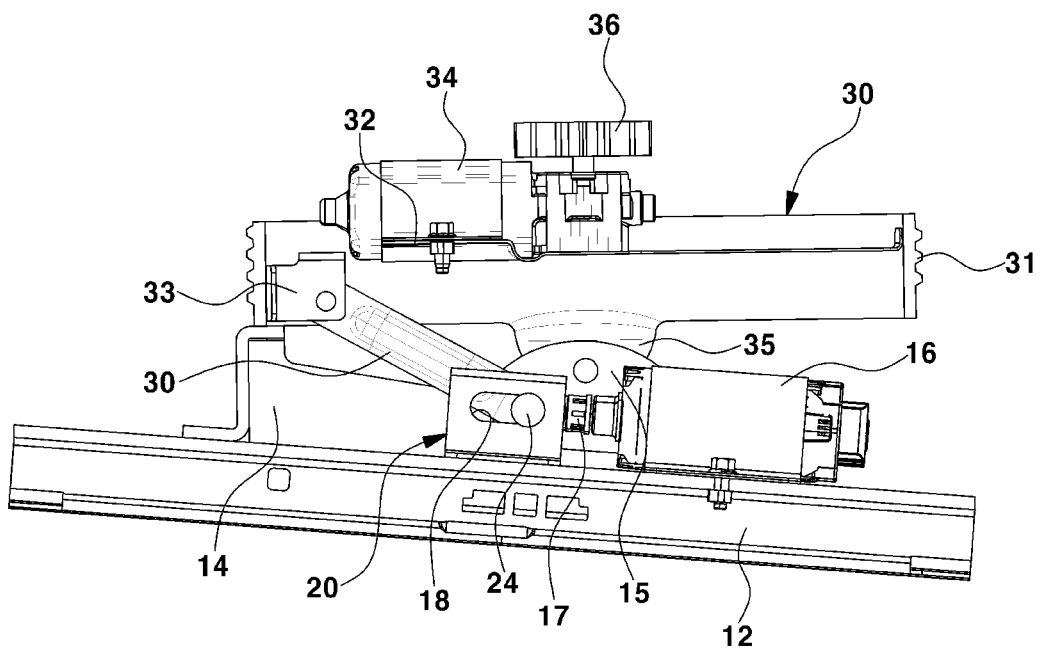
Figure 5:
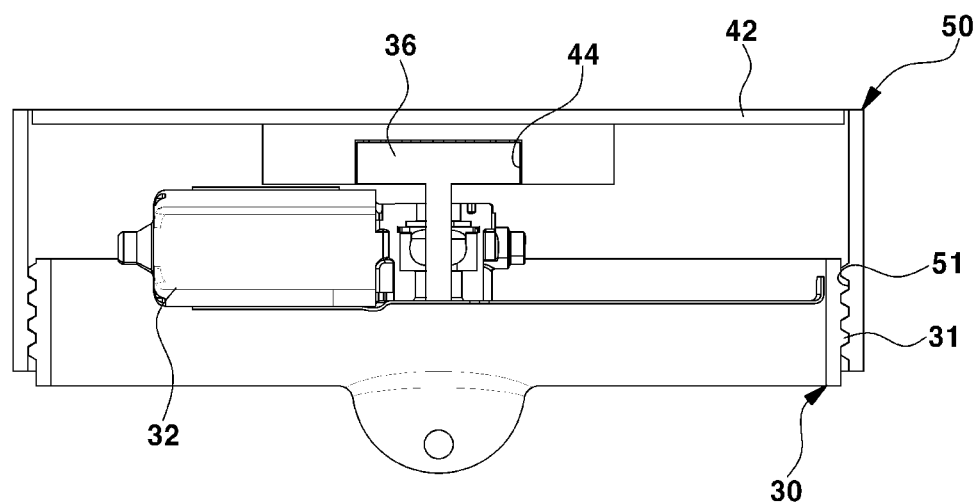
FIG. 5 is a cross-sectional view illustrating a coupling state between a first screw coupling body and a second screw coupling body of the device for swiveling and tilting a vehicle seat according to an exemplary embodiment of the present disclosure.

Referring to FIG. 3, a pinion gear 36 mounted on an output shaft of the first motor 34 may be engaged with the sector gear 44. Accordingly, a rotational driving force of the first motor 34 may be transmitted to the sector gear 44 via the pinion gear 36 and thus, the stationary plate 42 and the seat cushion frame 40 may be rotated. More specifically, when the female thread 51 of the first screw coupling body 50 and the male thread 31 of the second screw coupling body 30 are screw-fastened to each other, when the first motor 34 is rotationally driven, the rotational driving force of the first motor 34 may be transmitted to the sector gear 44 via the pinion gear 36 and thus, the stationary plate 42 on which the sector gear 44 is mounted and the seat cushion frame 40 on which the stationary plate 42 is mounted may be rotated.

Simultaneously, while the first screw coupling body 50 mounted on the stationary plate 42 is screw-rotated with respect to the second screw coupling body 30, it supports a rotation of the stationary plate 42 and the seat cushion frame 40 to stably support the stationary plate 42 and the seat cushion frame 40. In particular, an operational flow of the device for swiveling and tilting the vehicle seat of the present disclosure is described as follow.

Seat Swiveling Operation

First, when the female thread 51 of the first screw coupling body 50 and the male thread 31 of the second screw coupling body 30 are screw-fastened to each other, when the first motor 34 is rotationally driven, the rotational driving force of the first motor 34 may be transmitted to the sector gear 44 via the pinion gear 36. Thus, the stationary plate 42 on which the sector gear 44 is mounted and the seat cushion frame 40 on which the stationary plate 42 is mounted may be rotated.

Figure 6:
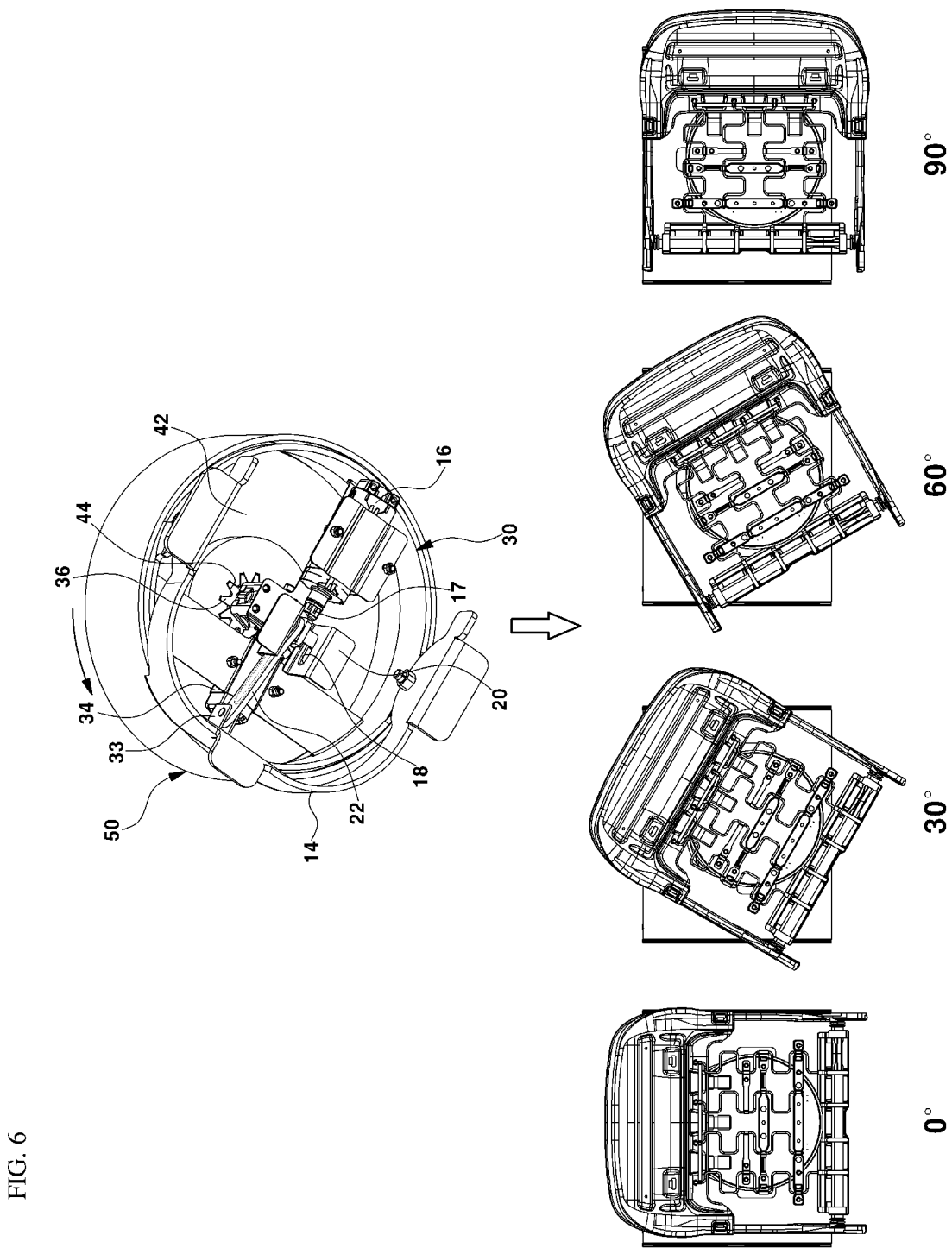
FIG. 6 is a view illustrating a swivel operation state of the vehicle seat according to an exemplary embodiment of the present disclosure.

Simultaneously, since the female thread 51 of the first screw coupling body 50 mounted on the stationary plate 42 is screw-rotated with respect to the male thread 31 of the second screw coupling body 30, the stationary plate 42 and the seat cushion frame 40 may be rotated in a desired direction as shown in FIG. 6, and the entire seat mounted on the seat cushion frame 40 may be consequently rotated in a desired direction.

As described above, by enabling the vehicle seat to be rotated in a desired direction, it may be possible to realize a face-to-face state and a conversation mode between occupants seated on the vehicle seat. Additionally, the vehicle seat may be optionally rotated in an outdoor direction (e.g., a door direction) for assisting the occupant to get on and out of the vehicle, thereby conveniently helping the occupant to get on and out of the vehicle.

Seat Tilting Operation

First, when the second motor 16 is driven for tilting the vehicle seat, the output shaft 17 of the second motor 16, which is adopted as a lead screw type, may be moved forward to push the tilting link 22. The guide pin 24 formed at the rear end portion of the tilting link 22 may be moved forward along the slot 18 of the guide bracket 20, and at the same time the front end portion of the tilting link 22 may provide a force to a front end portion of the second screw coupling body 30 to push upward the above front end portion upward.

Figure 7B:
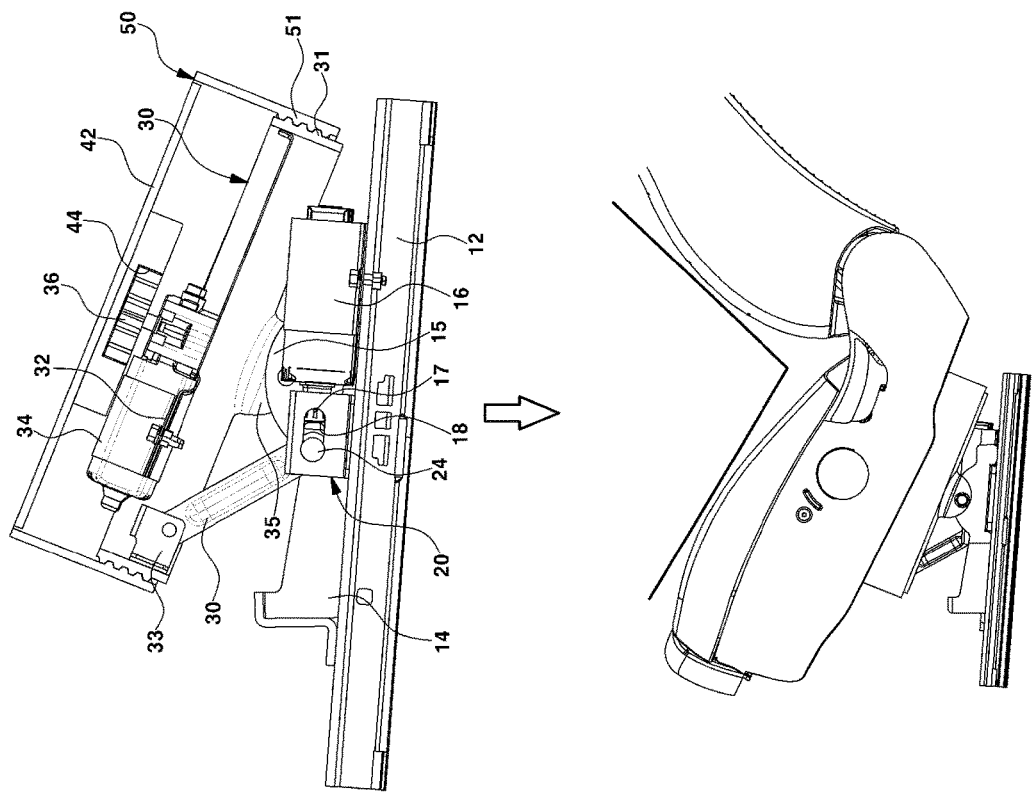
FIGS. 7A-7B are views illustrating a tilting operation state of the vehicle seat according to an exemplary embodiment of the present disclosure.
Figure 7A:
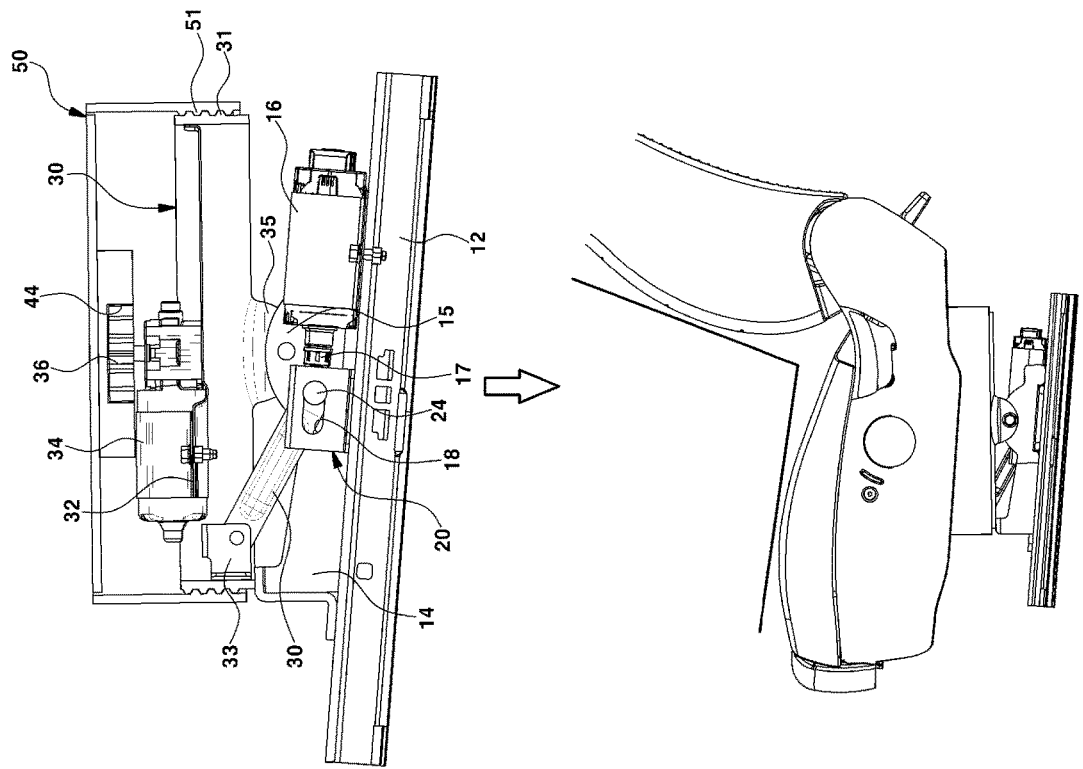

More specifically, as illustrated in FIGS. 7A-7B, when the front end of the tilting link 22 is hinge-connected to the link connecting end 33 of the second screw assembly 30, the guide pin 24 formed on the rear end portion of the tilting link 22 may be moved forward along the slot 18 of the guide bracket 20. Simultaneously, the front end portion of the tilting link 22 may push the link connecting end 33 of the second screw coupling body 30 upward and may be angularly rotated backward. Therefore, the second screw coupling body 30 may also be angularly rotated and tilted backward about its hinge rotation point (e.g., a point where the second hinge end 35 of the second screw coupling body 30 and the first hinge end 15 of the hinge bracket 14 overlap and are hinge-coupled to each other).

Simultaneously, the first screw coupling body 50 coupled to the second screw coupling body 30, the stationary plate 42 on which the first screw coupling body 50 is mounted, and the seat cushion frame 40 on which the stationary plate 42 is mounted may be tilted backward together and thus, the entire vehicle seat may be in tilted state. By tilting the vehicle seat backward by a predetermined angle as described, it may be possible to realize a lying posture of an occupant seated on the vehicle seat, thereby providing convenience to the occupant for relaxation such as rest and sleeping.

Meanwhile, as another exemplary embodiment of the present disclosure, the first screw coupling body and the second screw coupling body may be coupled to each other by a screw-coupling structure opposite to the structure applied to the above exemplary embodiment, and the structure for transmitting the rotational driving force of the first motor employed for swiveling the vehicle seat may also be configured differently.

Figure 8:
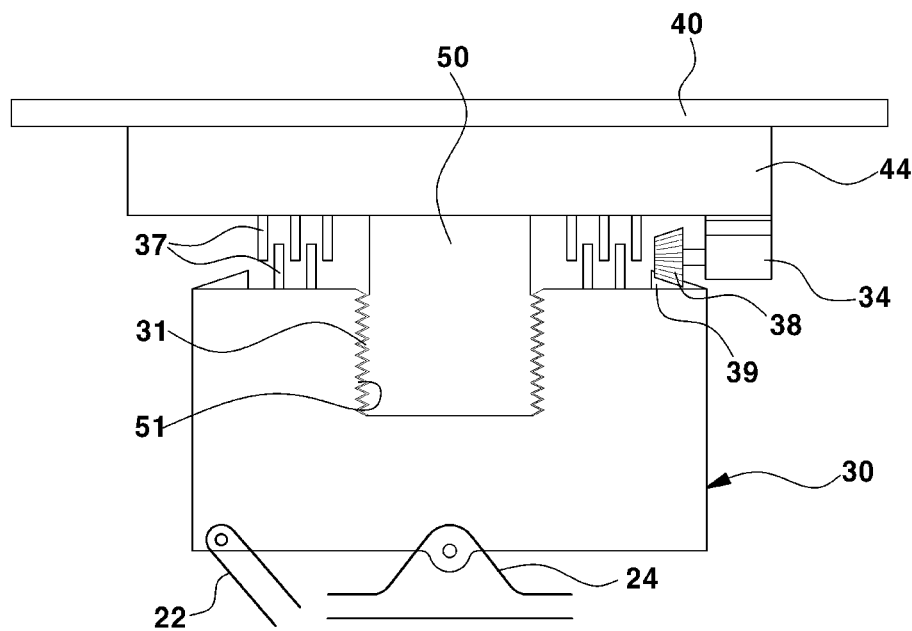
FIG. 8 is a side sectional view illustrating another embodiment of the device for swiveling and tilting a vehicle seat according to an exemplary embodiment of the present disclosure.

Accordingly, referring to FIG. 8, the first screw coupling body 50 may be formed to have the shape of a cylinder having the male thread 31 formed on an outer circumferential surface thereof and may be mounted to a lower surface of the stationary plate 42. In addition, the second screw coupling body 30 may be formed to have the shape of a cylinder having the female thread 51 formed on an inner circumferential surface thereof, and both side portions of the second screw coupling body may be hinge-fastened to the hinge brackets 14, respectively.

In addition, the first motor 34 employed for swiveling the vehicle seat and having a driving bevel gear 38 mounted to the output shaft thereof may be mounted at a predetermined position of the lower surface of the stationary plate 42, and a driven bevel gear 39 that engages the driving bevel gear 38 may be formed on an edge position of an upper surface of the second screw coupling body 30. A plurality of deviation preventing ribs 37 arranged alternately and spaced from each other may be integrally formed on the lower surface of the stationary plate 42 and on the upper surface of the second screw coupling body 30 along a circumferential direction.

Due to the above configuration, when the first motor 34 is driven, the rotational driving force may be transmitted from the driving bevel gear 38 mounted to the output shaft of the first motor 34 to the driven bevel gear 39. However, since the second screw coupling body 30 on which the driven bevel gear 39 is formed may be fixed to the track panel 10 via the hinge bracket 14 as described above, the driving bevel gear 38 may be moved along the driven bevel gear 39.

Since the first motor 34 having the driving bevel gear 38 mounted to the output shaft is fixed to the stationary plate 42, the stationary plate 42 may be consequently rotated, and the male thread 31 of the first screw coupling body 50 may be simultaneously rotated with respect to the female thread 51 of the second screw coupling body 30. Therefore, the seat swiveling operation in which the stationary plate 42 is rotated and the entire vehicle seat including the seat cushion frame on which the stationary plate 42 is mounted is simultaneously rotated in a desired direction may be performed.

The present disclosure provides the following effects through the above described means for solving the problems.

Firstly, by allowing the vehicle seat to be rotated in a desired direction, it may be possible to realize a face-to-face state and a conversation mode between occupants seated on the vehicle seat, and the vehicle seat may be optionally rotated in an outdoor direction (e.g., a door direction) for the occupants to get on and out of the vehicle, thereby conveniently helping the occupant to get on and out of the vehicle.

Secondly, by allowing the vehicle seat including a seat back and a seat cushion to be tilted backward at a predetermined angle, it may be possible to provide the occupant with convenience for relaxation such as rest and sleeping.

Thirdly, by installing the vehicle seat to which the swiveling and tilting mechanism of the present disclosure is applied, on an autonomous vehicle, it may be possible to improve convenience such as a conversation between occupants facing each other, looking out of a window, and the like through the seat swiveling operation, and it may be possible for an occupant to lie down through the seat tilting operation, thereby providing an occupant with a space and function for relaxation.

Although the present disclosure has been shown and described with reference to preferred embodiments thereof for illustrating a principle of the present disclosure, the present disclosure is not limited to the structure and the operation described with reference to the drawings in the above exemplary embodiments, and it will be appreciated by those skilled in the art that numerous changes and modifications of the disclosure are possible without departing from the spirit and scope defined in the appended claims.

What is claimed is:

1. A device for swiveling and tilting a vehicle seat, comprising;
   a track panel mounted on a floor panel;
   a hinge bracket mounted on the track panel;
   a stationary plate mounted on a seat cushion frame;
   a first screw coupling body mounted on a lower portion of the stationary plate;
   a second screw coupling body configured to be tiltably mounted on the hinge bracket;
   a first motor configured to provide a rotational driving force to the first screw coupling body or the second coupling body for swiveling the vehicle seat when the first screw coupling body and the second coupling body are screw-coupled with each other;
   a second motor mounted on the track panel for tilting the vehicle seat; and
   a tilting link hinge-connected between a front end portion of the second screw coupling body and an output shaft of the second motor.

2. The device for swiveling and tilting a vehicle seat of claim 1, wherein the first screw coupling body is provided as a cylindrical body having a female thread formed on an inner circumferential surface thereof and is mounted on an edge of a lower surface of the stationary plate.

3. The device for swiveling and tiling a vehicle seat of claim 2, wherein the second screw coupling body is provided as a cylindrical body having a male thread formed on an outer circumferential surface thereof, and a motor mounting plate for mounting the first motor is mounted on an inner circumferential surface of the second screw coupling body, both sides of the second screw coupling body are hinge-coupled to the hinge bracket.

4. The device for swiveling and tilting a vehicle seat of claim 3, wherein a pinion gear is mounted to an output shaft of the first motor, and a sector gear that engages the pinion gear is formed on the lower surface of the stationary plate.

5. The device for swiveling and tilting a vehicle seat of claim 1, wherein a pair of guide brackets are mounted on the track panel, each of the guide brackets has an elongated slot formed thereon, and guide pins formed on both sides of a rear end portion of the tilting link are inserted into the slots of the guide brackets, respectively.

6. The device for swiveling and tilting a vehicle seat of claim 1, wherein a link connecting end is integrally formed with a front portion of the inner circumferential surface of the second screw coupling body to be hinge-coupled with the tilting link.

7. The device for swiveling and tilting a vehicle seat of claim 1, wherein first hinge ends are integrally formed with both sides of the hinge bracket, respectively, and second hinge ends are integrally formed at lower end portions of both sides of the second screw assembly, respectively, wherein each of the second hinge ends overlaps and is coupled with a corresponding first hinge end by a hinge pin.

8. The device for swiveling and tilting a vehicle seat of claim 1, wherein the first screw coupling body is provided as a cylindrical body having a male thread formed on an outer circumferential surface thereof and is mounted on a lower surface of the stationary plate.

9. The device for swiveling and tilting a vehicle seat of claim 8, wherein the second screw coupling body is provided as a cylindrical body having a female thread formed on an inner circumferential surface thereof, and both sides of the second screw coupling body are hinge-coupled to the hinge bracket.

10. The device for swiveling and tilting a vehicle seat of claim 9, wherein the first motor having a driving bevel gear mounted on the output shaft thereof is mounted on a predetermined position of the lower surface of the stationary plate, and a driven bevel gear that engages the driving bevel gear is formed on an upper surface of the second screw coupling body.

11. The device for swiveling and tilting a vehicle seat of claim 10, wherein a plurality of deviation preventing ribs which are arranged alternately and spaced from each other are integrally formed on the lower surface of the stationary plate and on the upper surface of the second screw coupling body along a circumferential direction.

12. The device for swiveling and tilting a vehicle seat of claim 1, wherein the track panel has slide rails formed on both sides of a lower surface thereof, respectively, for adjusting front-rear positions of the vehicle seat.

* * * * *